(No Model.)
J. E. SAMPSON.
STOP MECHANISM FOR LATHES.
No. 457,974. Patented Aug. 18, 1891.
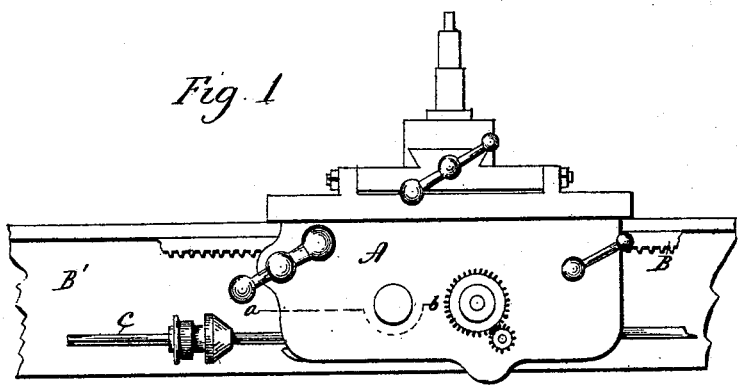
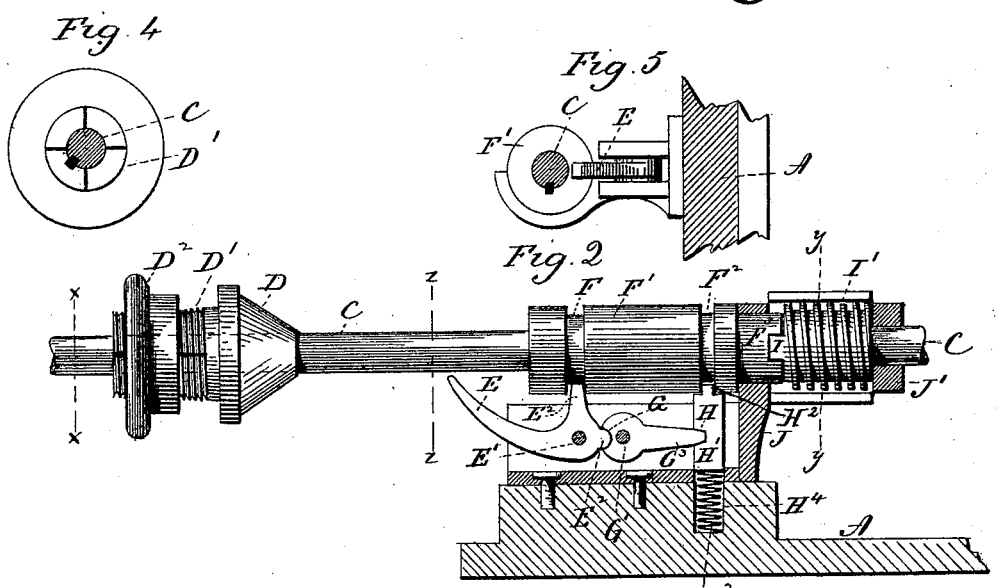
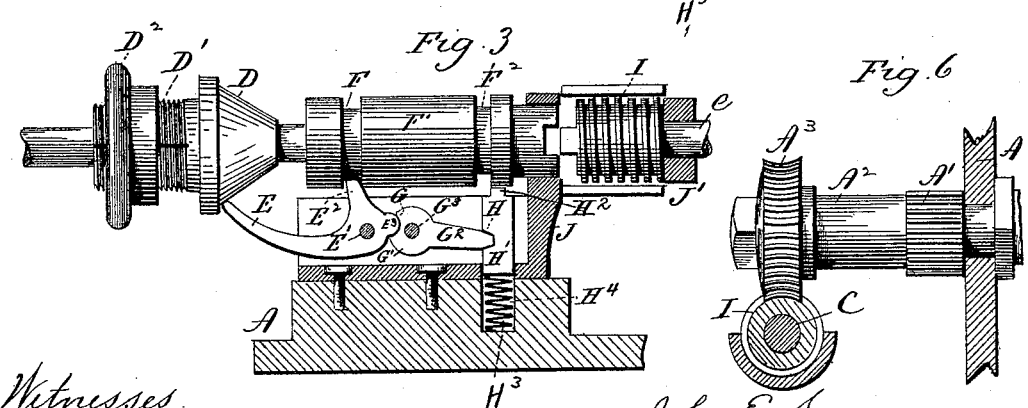
Witnesses
J. H. Shumway
Lillian D. Kelsey
John E. Sampson, Inventor
By attys.
Earle & Seymour
THE NORRIS PETERS CO., PHOTO-LITHO., WASHINGTON, D. C.

UNITED STATES PATENT OFFICE.

JOHN E. SAMPSON, OF NEW HAVEN, CONNECTICUT, ASSIGNOR TO THE NEW HAVEN MANUFACTURING COMPANY, OF SAME PLACE.

STOP MECHANISM FOR LATHES.

SPECIFICATION forming part of Letters Patent No. 457,974, dated August 18, 1891.

Application filed April 17, 1891. Serial No. 389,264. (No model.)

*To all whom it may concern:*

Be it known that I, JOHN E. SAMPSON, of New Haven, in the county of New Haven and State of Connecticut, have invented new Improvements in Stop Mechanism for Lathes; and I do hereby declare the following, when taken in connection with accompanying drawings and the letters of reference marked thereon, to be a full, clear, and exact description of the same, and which said drawings constitute part of this specification, and represent, in—

Figure 1, a view in front elevation of a lathe provided with a stop mechanism constructed in accordance with my invention; Fig. 2, a view, partly in plan and partly in section, taken on the line $a\,b$ of Fig. 1 and drawn on a larger scale than the same and showing the gear connected for moving the tool-carriage; Fig. 3, a similar view showing the gear disconnected for stopping the tool-carriage; Fig. 4, a view in vertical section on line $x\,x$ of Fig. 2 and looking toward the outer end of the adjustable stop; Fig. 5, a view in vertical section on line $z\,z$ of Fig. 2 and looking toward the outer end of the operating-sleeve; Fig. 6, a similar view taken on the line $y\,y$ of Fig. 2 and showing the connection of the gear with the driving-shaft of the tool-carriage.

My invention relates to an improvement in stop mechanism for lathes, the object being to produce a simple, durable, and reliable mechanism for stopping the tool-carriage of a lathe at a predetermined place.

With these ends in view my invention consists in the combination, with a stationary rack of a driven shaft and an adjustable stop mounted upon the said shaft and formed with a conical operating-face, of a tool-carriage having a sleeve constructed with two annular grooves and longitudinally but not rotatably mounted on the shaft, a worm-gear loosely mounted on the shaft and adapted to be interlocked with the sleeve, a key entering one groove in the sleeve for normally locking it against longitudinal movement on the shaft, a key-lever for operating the said key, an operating-lever operatively connected with the key-lever, connected with the sleeve through the other groove therein and constructed to engage with the conical face of the stop and continuous between the said worm-gear and the rack.

My invention further consists in certain details of construction and combinations of parts, as will be hereinafter described, and pointed out in the claims.

My invention is applicable to any lathes of ordinary construction, and I have not therefore shown, nor shall I describe, more than the features necessary to an understanding of my improvement.

As herein shown, the tool-carriage A is furnished with a driven pinion A', mounted upon a shaft $A^2$ and intermeshing with a stationary horizontal rack B, attached to the bed of the lathe. The lathe is also provided with a horizontal shaft C, driven in any convenient manner and having mounted upon it an adjustable stop formed with a conical operating-face D at its inner end and an exteriorly-threaded longitudinally-slotted shank D', formed at its outer end. The said shank D' of the sleeve receives an adjusting-nut $D^2$, by means of which said shank is clamped upon the shaft. By turning the nut outward the several portions of the shank spring apart or recover and permit the stop to be moved along the shaft until the desired adjustment has been made, after which the nut is turned inward until the said portions of the shank have been sprung inward and firmly bound to the shaft again. The said conical face D of the stop is engaged by the long arm E of an operating-lever hung upon a stud E' in the carriage A, and also provided with a short arm $E^2$, which enters and freely plays in an annular groove F, formed in the outer end of a sleeve F', which is feathered or otherwise mounted upon the shaft, so as to be movable longitudinally but not rotatably thereupon. The said operating-lever is also provided with a lug $E^3$, which enters a corresponding recess G, formed in the hub G' of a key-lever $G^2$, hung upon a stud $G^3$ in the tool-carriage A, and adapted at its end to enter a recess H, formed to receive it in the key H', the inner end of which has a tooth $H^2$ formed upon it to enter an annular groove $F^2$, formed near the inner end of the operating-sleeve F', before mentioned. A spiral spring $H^3$, located in a chamber $H^4$, formed in the tool-carriage, is provided for exerting a constant effort to throw the tooth H² of the key into the annular groove F² of the sleeve F'. The extreme inner end of the sleeve is provided with a slot F³, which receives a corresponding tenon I, formed upon the adjacent end of a worm-gear I', loosely mounted on the shaft C, but held from endwise displacement thereupon by the bearing J of the carriage A and by the collar J', mounted upon the said shaft. The said worm-gear I' meshes into a spiral toothed wheel A³, mounted upon the driving-shaft A² of the tool-carriage.

In the normal adjustment of the parts under the above-described construction the spring H³ holds the key in engagement with the sleeve, which is thus kept coupled with the worm-gear I', which is thus driven for actuating the tool-carriage. When, however, the arm E of the operating-lever engages with the conical face D of the stop, the said arm will be moved outward away from the shaft C and operate the key-lever in retracting the tooth H² of the key H' from the annular groove F² in the operating-sleeve F', which is thus released for longitudinal movement upon the shaft. Now as the arm E of the operating-lever is moved still farther outward by the conical face D the arm E² of the said lever will move the sleeve on the shaft and away from the worm-gear I', so as to disconnect the two parts, as shown by Fig. 3 of the drawings. When this occurs, the tool-carriage at once stops its movement. The position in which the carriage is stopped may be predetermined by shifting the adjustable stop upon the driven shaft C, as has been heretofore explained.

My improved device contains few parts, is of simple and strong construction, and is very reliable in operation and convenient to set.

Having fully described my invention, what I claim as new, and desire to secure by Letters Patent, is—

1. In a stop mechanism for lathes, the combination, with a stationary rack, a driven shaft, and an adjustable stop mounted upon the said shaft and formed with a conical operating-face, of a tool-carriage having a sleeve constructed with two annular grooves and longitudinally but not rotatably mounted on the shaft, a worm-gear loosely mounted on the shaft and adapted to be interlocked with the sleeve, a key entering one groove in the sleeve for locking it against longitudinal movement on the shaft, a key-lever for operating the said key, an operating-lever operatively connected with the key-lever and having an arm entering the other groove in the sleeve, and also an arm arranged to engage with the conical face of the stop, and gearing between the worm-gear and the said rack, substantially as described.

2. In a stop mechanism for lathes, the combination, with a stationary rack, a driven shaft, and an adjustable stop mounted upon the said shaft and formed with a conical operating-face, of a tool-carriage having a sleeve constructed with two annular grooves and longitudinally but not rotatably mounted on the shaft, a gear-wheel loosely mounted on the shaft and adapted to be interlocked with the sleeve, a key entering one groove in the sleeve for normally locking it against longitudinal movement on the shaft, a key-lever for operating the said key, an operating-lever operatively connected with the key-lever having an arm entered into the other groove in the sleeve and an arm arranged to engage with the conical face of the stop, means for keeping the key in normal engagement with the sleeve, and connection between the said worm-gear and the rack, substantially as described.

In testimony whereof I have signed this specification in the presence of two subscribing witnesses.

JOHN E. SAMPSON.

Witnesses:
C. T. SAMPSON,
S. E. MURBERG.